United States Patent
Meunier et al.

(10) Patent No.: US 10,480,421 B2
(45) Date of Patent: Nov. 19, 2019

(54) SYSTEM AND METHOD FOR AN ENGINE CONTROLLER BASED ON ACCELERATION POWER

(71) Applicant: PRATT & WHITNEY CANADA CORP., Longueuil (CA)

(72) Inventors: Gabriel Meunier, Saint-Bruno-de-Montarville (CA); Alexandre Charest, Montreal (CA); Sylvain Lamarre, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 98 days.

(21) Appl. No.: 15/361,251

(22) Filed: Nov. 25, 2016

(65) Prior Publication Data
US 2018/0038287 A1    Feb. 8, 2018

Related U.S. Application Data

(60) Provisional application No. 62/371,006, filed on Aug. 4, 2016.

(51) Int. Cl.
| | | |
|---|---|---|
| G06F 19/00 | (2018.01) | |
| G06G 7/70 | (2006.01) | |
| F02C 9/26 | (2006.01) | |
| F01D 21/00 | (2006.01) | |

(52) U.S. Cl.
CPC ............ *F02C 9/263* (2013.01); *F01D 21/003* (2013.01); *F05D 2220/32* (2013.01); *F05D 2270/04* (2013.01); *F05D 2270/304* (2013.01); *F05D 2270/306* (2013.01); *F05D 2270/54* (2013.01); *F05D 2270/708* (2013.01)

(58) Field of Classification Search
None
See application file for complete search history.

(56) References Cited

U.S. PATENT DOCUMENTS

| | | |
|---|---|---|
| 3,606,754 A | 9/1971 | White |
| 4,341,071 A | 7/1982 | Abo et al. |
| 5,083,277 A | 1/1992 | Shutler |
| 5,609,465 A | 3/1997 | Batson et al. |
| 8,015,791 B2 | 9/2011 | Finkbeiner |
| 8,689,539 B2 | 4/2014 | Lu et al. |
| 8,849,542 B2 | 9/2014 | Meisner et al. |
| 2008/0221710 A1 | 9/2008 | Brunell |
| 2015/0378327 A1 | 12/2015 | Li et al. |
| 2016/0069276 A1 | 3/2016 | Djelassi |

FOREIGN PATENT DOCUMENTS

| | | |
|---|---|---|
| EP | 0324633 | 7/1989 |
| WO | 2004025100 | 3/2004 |

*Primary Examiner* — Bhavesh V Amin
(74) *Attorney, Agent, or Firm* — Norton Rose Fulbright Canada LLP

(57) ABSTRACT

Systems and methods for controlling an gas turbine engine are provided. The method comprises receiving a requested engine speed and obtaining a shaft inertia of the engine, a steady state fuel flow for the requested engine speed, and a relationship between fuel flow and acceleration power generated by the fuel flow. A required fuel flow to obtain an engine acceleration is determined as a function of the requested engine speed, the shaft inertia of the engine, the steady state fuel flow for the requested engine speed, and the relationship between fuel flow and acceleration power generated by the fuel flow. A command to a fuel flow metering valve is output in accordance with the required fuel flow.

20 Claims, 6 Drawing Sheets

SYSTEM AND METHOD FOR AN ENGINE CONTROLLER BASED ON ACCELERATION POWER

CROSS-REFERENCE TO RELATED APPLICATIONS

The application claims the benefit of U.S. Provisional Patent Application No. 62/371,006 filed on Aug. 4, 2016, the contents of which are hereby incorporated by reference.

TECHNICAL FIELD

The disclosure relates generally to the field of gas turbine engine control, and more particularly, to an engine controller with a feedforward controller.

BACKGROUND

Methodologies used for controlling the acceleration of a gas turbine engine shaft include the use of a feedback controller. However, there are challenges achieving a desired response time while maintaining a certain stability margin when using a feedback controller. To overcome this issue, a feedforward controller is used in conjunction with the feedback controller. The feedforward controller can decrease the response time without penalizing stability margin. The feedforward controller is typically tuned iteratively in test. This operation is repeated for an array of operating points covering the gas turbine engine flight envelope. This method, which requires iterative testing of the engine, is resource consuming and expensive when the flight envelope is large.

Improvements in control systems are therefore desirable.

SUMMARY

In accordance with one broad aspect, there is provided a system for controlling a gas turbine engine. The system comprises an interface to a fuel flow metering valve for controlling a fuel flow to the engine in response to a fuel flow command and a controller connected to the interface and configured for outputting the fuel flow command to the fuel flow metering valve in accordance with a required fuel flow. The controller comprises a feedforward controller configured for receiving a requested engine speed and obtaining a shaft inertia of the engine, a steady state fuel flow for the requested engine speed, and a relationship between fuel flow and acceleration power generated by the fuel flow. The feedforward controller is also configured for determining the required fuel flow to obtain an engine acceleration as a function of the requested engine speed, the shaft inertia of the engine, the steady state fuel flow for the requested engine speed, and the relationship between fuel flow and acceleration power generated by the fuel flow.

In accordance with another broad aspect, there is provided a method for controlling a gas turbine engine. The method comprises receiving a requested engine speed and obtaining a shaft inertia of the engine, a steady state fuel flow for the requested engine speed, and a relationship between fuel flow and acceleration power generated by the fuel flow. A required fuel flow to obtain an engine acceleration is determined as a function of the requested engine speed, the shaft inertia of the engine, the steady state fuel flow for the requested engine speed, and the relationship between fuel flow and acceleration power generated by the fuel flow. A command to a fuel flow metering valve is output in accordance with the required fuel flow.

In accordance with yet another broad aspect, there is provided a non-transitory computer-readable medium having stored thereon program code executable by a processor for controlling a gas turbine engine. The program code comprises instructions for receiving a requested engine speed and obtaining a shaft inertia of the engine, a steady state fuel flow for the requested engine speed, and a relationship between fuel flow and acceleration power generated by the fuel flow. The program code also comprises instructions for determined a required fuel flow to obtain an engine acceleration is determined as a function of the requested engine speed, the shaft inertia of the engine, the steady state fuel flow for the requested engine speed, and the relationship between fuel flow and acceleration power generated by the fuel flow, and outputting a command to a fuel flow metering valve in accordance with the required fuel flow.

DESCRIPTION OF THE DRAWINGS

Reference is now made to the accompanying figures in which.

DETAILED DESCRIPTION

Figure 1:
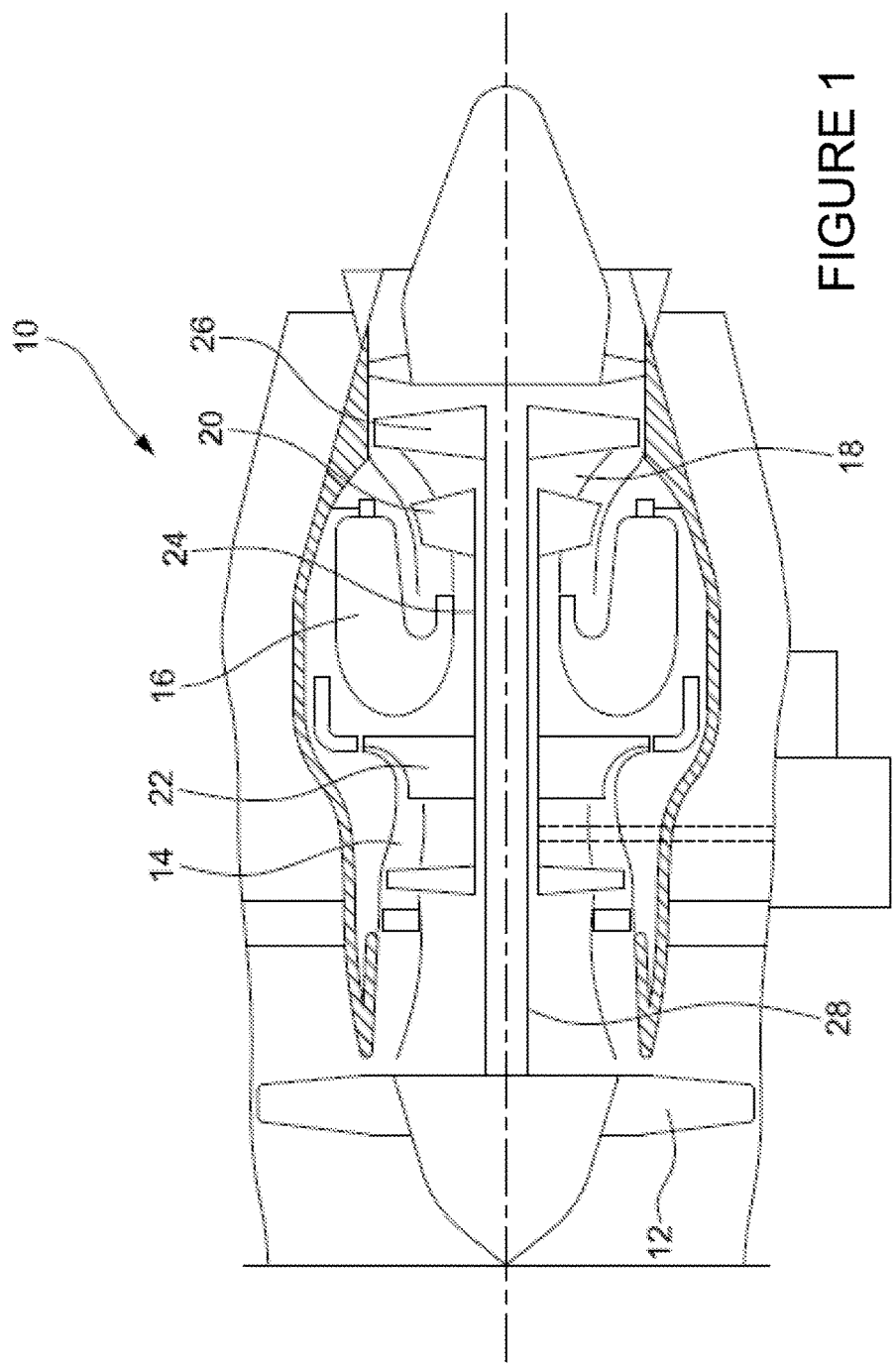
FIG. 1 is a schematic cross-sectional view of a gas turbine engine.

FIG. 1 illustrates a gas turbine engine 10 of a type provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom. Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply.

Figure 2:
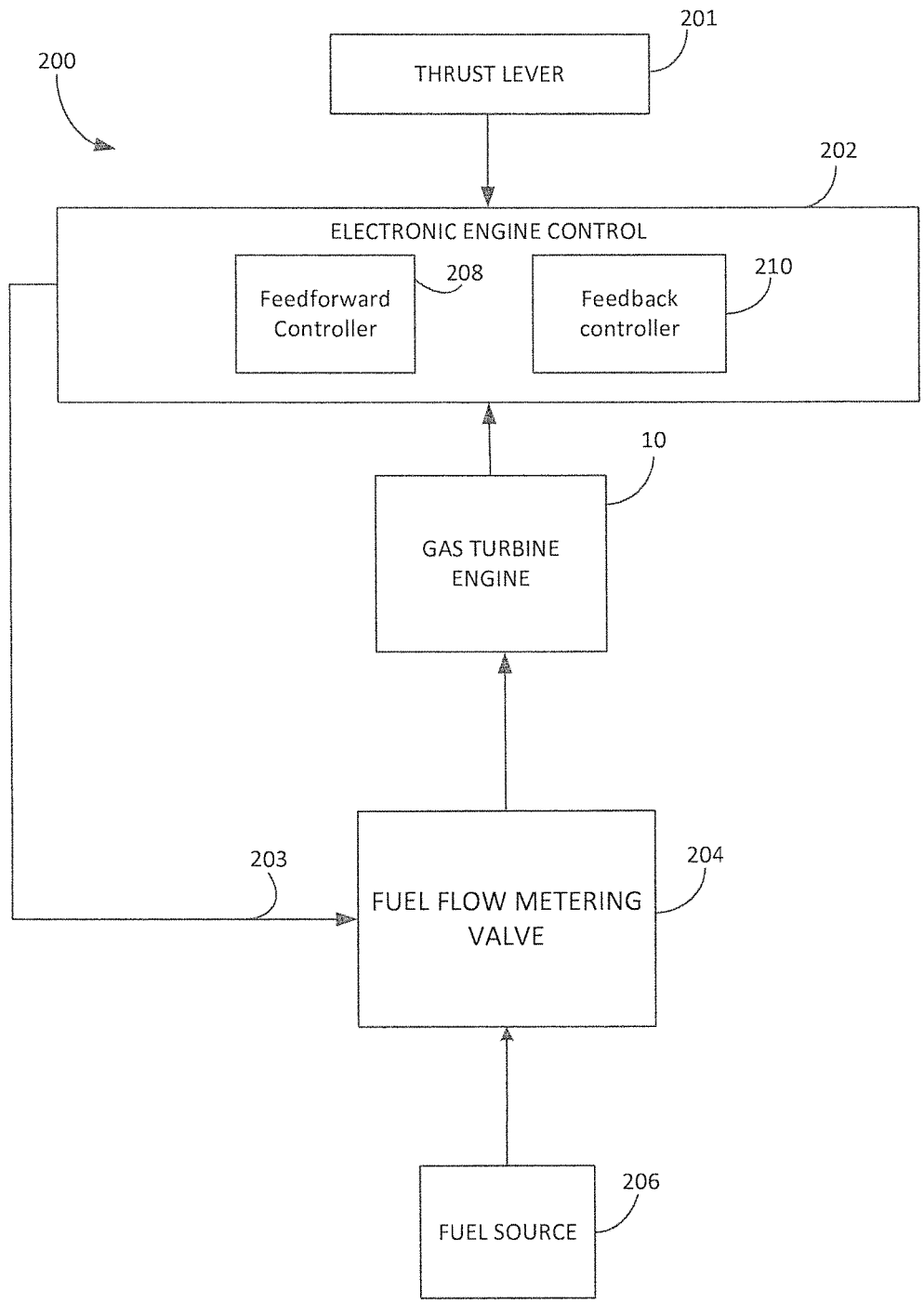
FIG. 2 is a block diagram of an example aircraft system.

FIG. 2 illustrates the gas turbine engine 10 of FIG. 1 within an aircraft 200. Engine thrust is controlled by a full authority digital electronic control (FADEC) which regulates the speed of the high pressure rotor(s) 20, 22 and low pressure rotor(s) 26 in response to a pilot-operated thrust lever, ambient conditions, pilot selection and aircraft discrete inputs. For simplicity, only the main control system components of the FADEC, namely a controller or an electronic engine control (EEC) 202, a thrust lever 201, and a fuel flow metering valve 204, are illustrated. FADEC works by receiving multiple input variables of the current flight condition including air density, throttle lever position, engine temperatures, engine pressures, and many other parameters. The inputs are received by EEC 202 and analyzed multiple times per second. Engine operating parameters such as fuel flow, stator vane position, bleed valve position, and others may be computed from this data and applied as appropriate. The FADEC may be a single channel FADEC or a dual channel architecture.

The fuel flow metering valve or simply metering valve 204 is connected to the EEC 202 via an interface or connection 203. The fuel flow metering valve 204 is arranged to control a fuel flow to the engine in response to a fuel flow command from the EEC 202. The metering valve 204 is under direct control from EEC 202 and enables thrust control, in response to variable guide vane position demands and fuel flow demands. The metering valve 204 provides the engine 10 with fuel from a fuel source 206 at a required pressure and flow to permit control of engine power. EEC 202 comprises digital logic to energize the metering valve 204. Sensor data obtained for a low rotor and/or a high pressure rotor can provide information about the speed of the engine 10.

EEC 202 is a controller operationally connected to the fuel flow metering valve 204 via the interface 203 and configured to generate the fuel flow command. For example, EEC 202 may comprise a feedforward controller 208 and optionally a feedback controller 210. EEC 202 may be configured to control the gas turbine shaft acceleration through fuel flow regulation. The feedforward controller 208 allows, in conjunction with a feedback controller 210, the tracking of the reference acceleration without the need for iterative gain tuning.

Figure 3:
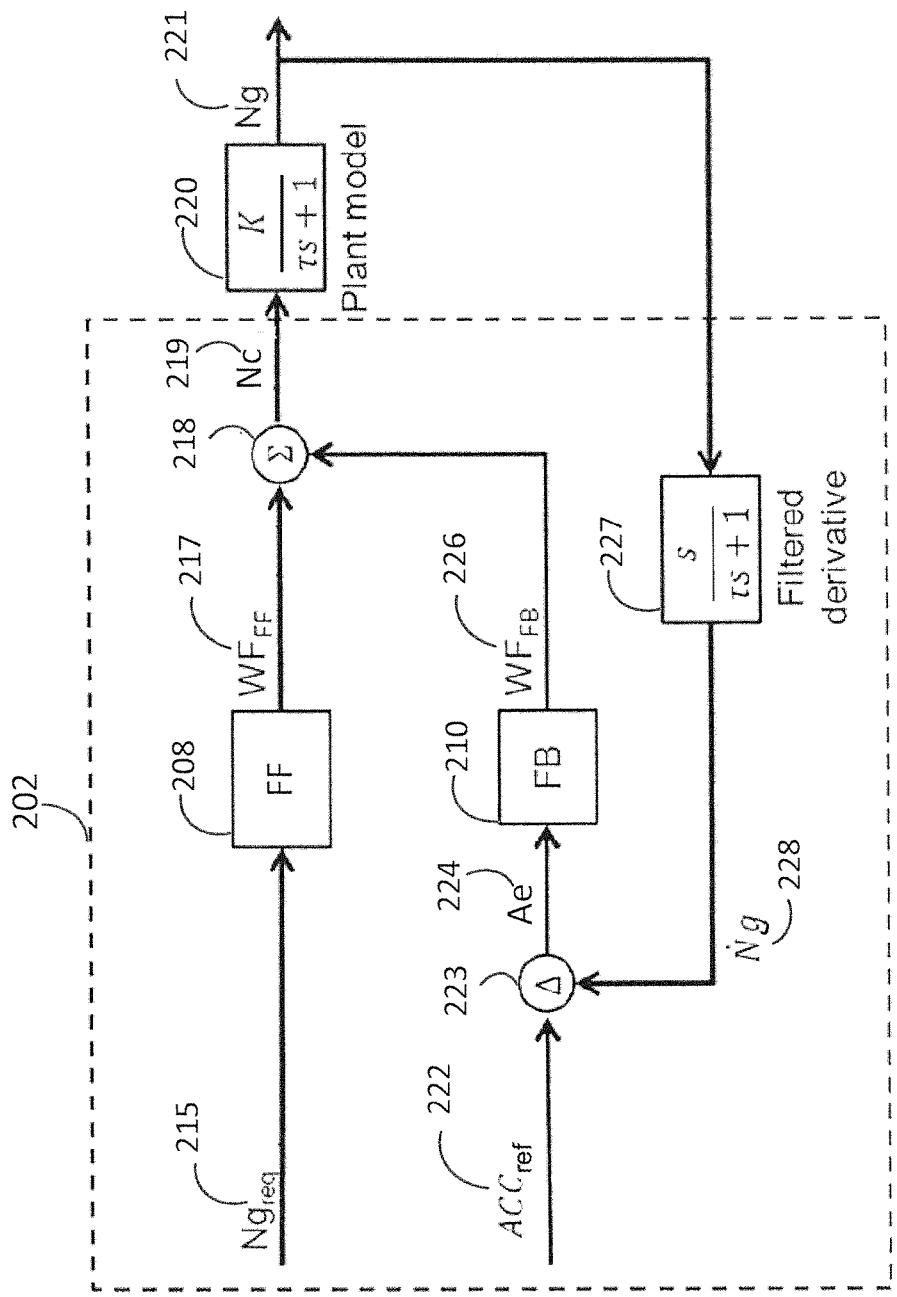
FIG. 3 is a schematic diagram of an example controller for an engine.

FIG. 3 shows an example implementation inside EEC 202 of a method to control gas turbine engine 10 in accordance with one embodiment. EEC 202 includes a feedforward controller 208 and a feedback controller 210. A signal 215 representing a requested gas generator speed, denoted by Ngreq, is input to the feedforward controller 208. In some embodiments, Ngreq 215 is the requested gas generator shaft speed. Signal Ngreq 215 may be obtained from a data table or an outer control loop. For example, Ngreq 215 may be the Ng requested by the outer control loop to achieve a certain engine power level, or thrust level. Ngreq 215 may also be a speed value selected to avoid a given engine limitation. Feedforward controller 208 is configured to determine and output a feedforward fuel flow $WF_{FF}$ 217. The feedforward fuel flow $WF_{FF}$ is used to compute a total fuel flow $WF_{tot}$ and generate a fuel flow signal Nc 219. The fuel flow signal Nc 219 is then sent to the gas turbine engine 10, represented by plant model 220, as an actuator command for controlling gas turbine speed and acceleration.

In order to generate the fuel flow command Nc 219, a feedback controller 210 may also be implemented, together with the feedforward controller 208. The feedback controller 210 forms a closed loop, the feedforward controller 208 forms an open-loop. The feedback controller 210 may be any kind of suitable feedback controller such as a proportional-integral-derivative (PID) controller. A feedback fuel flow $WF_{FB}$ 226 may be generated by the feedback controller 210 and sent to summation junction 218, together with the feedforward fuel flow $WF_{FF}$ 217, to determine the fuel flow signal Nc 219, which may be computed based on both the feedforward fuel flow $WF_{FF}$ 217 and the feedback fuel flow $WF_{FB}$ 226.

In some embodiments, the feedback controller 210 takes as input acceleration error Ae 224 that is determined as the difference between an acceleration reference ACCref 222 and a filtered acceleration Ṅg 228. The acceleration reference ACCref 222 and the filtered acceleration Ṅg 228 are sent to a subtraction junction 223 to compute the acceleration error Ae 224. For example, the filtered acceleration Ṅg 228 may be removed from the acceleration reference ACCref 222 to result in the acceleration error value Ae 224.

In some embodiments, the acceleration reference ACCref 222 is obtained from a data table (not shown). The data table may be pre-determined based on characteristics of engine 10.

The filtered acceleration Ṅg 228 may be obtained by taking a gas generator speed Ng 221 and feeding it through a filtered derivative function 227, which may generate a numerical derivative. The gas generator speed Ng 221 may be obtained in a number of ways. For example, it may be a measured value of the gas turbine shaft speed obtained from gas engine 10. Alternatively, the gas generator speed Ng 221 may be an output of a plant model 220. The plant model 220 may be implemented based on a function representing suitable engine dynamics of engine 10, such as the transfer function:

$$\frac{K}{\tau s + 1},$$

where τ represents an estimated time constant of the plant model and K represents an estimated gain of the plant model. For example, all hardware involved in fuel delivery to the engine 10 and its respective relationships may be simplified and modelled in the plant model 220. The plant model 220 may take the fuel flow command Nc 219 as input and generate the gas generator speed Ng 221.

In accordance with some embodiments, a model-based feedforward controller 208 is used to control the acceleration of the gas turbine engine 10 based on a relationship between fuel flow and acceleration power. This relationship may be represented by an equation that links the fuel flow to the engine to the acceleration power generated on the shaft from the fuel flow. Any additional fuel flow supplied to the engine in order to operate the engine in steady-state at a new gas generator speed is referred to as over-fueling and is represented by ΔWf. The relationship between fuel flow and acceleration power is simplified as a linear equation (1) below:

$$K(\Delta Wf) = P_{Accel} \quad (1)$$

where ΔWf represents the over-fueling of the engine; $P_{Accel}$ represents the corresponding acceleration power of the engine generated from the over-fueling ΔWf; K is a linear coefficient, and $P_{Accel}$ is a factor of ΔWf based on the linear coefficient.

Accordingly, in some embodiments, the system is operable to obtain a linear coefficient value K, where the corresponding acceleration power $P_{Accel}$ is a factor of the over-fueling ΔWf based on the linear coefficient value K, and to determine a feedforward fuel flow based on the linear coefficient.

Accordingly, the feedforward controller 208 calculates a feedforward fuel flow $WF_{FF}$ 217 based on a relationship between an over-fueling ΔWf of the engine and a corresponding acceleration power $P_{Accel}$ of the engine generated from the over-fueling ΔWf based on equation (1) above.

Equation (1) may be re-arranged as equation (2) below:

$$K(Wf_{tot}-Wf_{ss})=J_{gg}N_g\dot{N}_g K_{units} \qquad (2)$$

Where Wftot represents a total fuel flow; Jgg represents a shaft inertia of the engine; Ng represents a gas generator speed, which may be a gas generator shaft speed; Wfss (also shown as WFss in FIGS. 3 and 4) represents the steady state fuel flow for Ng; and Kunits represents a coefficient accounting for unit conversions.

By replacing the gas generator speed Ng with the requested gas generator speed Ngreq, and replacing Wftot with the feedforward fuel flow $Wf_{FF}$, this equation can be rearranged to equation (3) below to better fit a feedforward controller 208:

$$K(Wf_{FF} - Wf_{SS}) = J_{gg}Ng_{req}\dot{N}g_{req}K_{units} \qquad (3)$$

$$(Wf_{FF} - Wf_{SS}) = \frac{J_{gg}Ng_{req}\dot{N}g_{req}K_{units}}{K}$$

$$Wf_{FF} = \frac{J_{gg}Ng_{req}\dot{N}g_{req}K_{units}}{K} + Wf_{SS}$$

Figure 4:
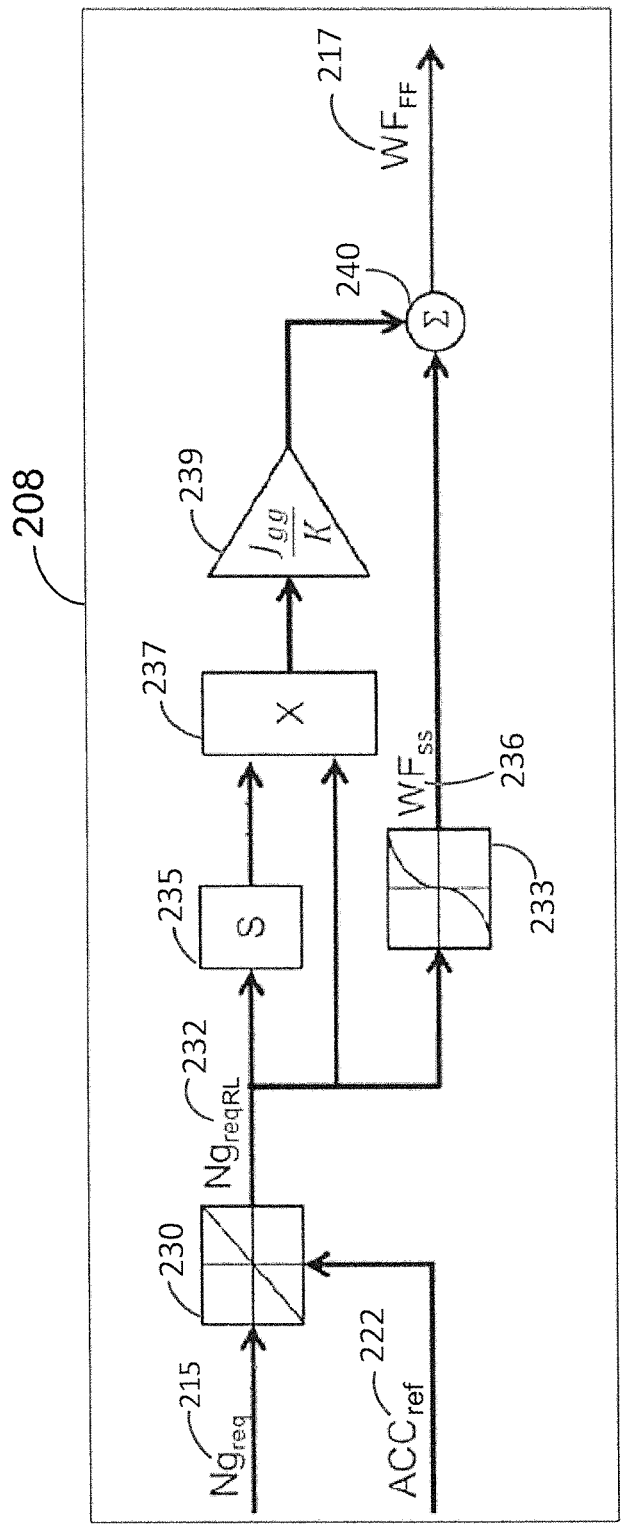
FIG. 4 is a schematic diagram of an example feedforward controller for an engine.

Reference is now made to FIG. 4, which shows an example feedforward controller 208 in accordance with one embodiment, implemented based on equation (3) above. In one aspect of the embodiment, the feedforward controller 208 is configured to receive a requested gas generator speed of the engine Ngreq 215, a parameter representing a shaft inertia of the engine Jgg; and a parameter representing a steady state fuel flow WFss 236 for the requested gas generator speed; and determine a feedforward fuel flow $WF_{FF}$.

In some embodiments, in order to limit engine acceleration to a certain threshold, the feedback controller 208 receives a reference acceleration ACCref 222. A rate-limited gas generator speed NgreqRL 232 is obtained by applying the requested gas generator speed Ngreq 215 to rate-limiter 230 based on the reference acceleration ACCref 222. This way, a time derivative of the rate-limited gas generator speed NgreqRL 232 does not exceed the reference acceleration ACCref 222, thereby controlling acceleration of the engine 10. The feedforward fuel flow $WF_{FF}$ 217 may then be determined based on the rate-limited gas generator speed NgreqRL 232.

The rate-limited gas generator speed NgreqRL 232 is sent to a differentiator 235. The differentiator may be for example a forward Euler derivative or any other suitable derivative function. The resulting signal, which is a rate-limited gas generator acceleration ṄgreqRL, is multiplied at 237 by NgreqRL 232, then multiplied again by the gas generator shaft inertia Jgg and divided by the linear coefficient K at 239. The resulting signal is then sent to a summation junction 240. The rate-limited gas generator speed NgreqRL 232 is used to determine a steady state fuel flow WFss 236 at 233. For example, a look-up table may be used to determine the steady state fuel flow WFss 236 based on NgreqRL 232. This look-up table contains the appropriate WFss 236 value that corresponds to the desired rate-limited gas generator speed NgreqRL 232. The resulting steady state fuel flow WFss 236 is sent to the summation junction 240. The final output generated by the summation junction 240 is the feedforward fuel flow $WF_{FF}$ 217, as shown in equation (3).

The systems and methods described herein require a small amount of data to be computed or obtained. For example, in some embodiments, only the shaft inertia Jgg, the linear co-efficient K and the steady-state fuel flow WFss for a plurality of operating points of the engine are needed to operate the EEC 202. These values may be readily obtained from a data table that may be stored either within or outside EEC 202. The data table may be pre-determined based on the characteristics of engine 10. For example, the values Jgg, K, and WFss may be pre-populated and entered into the data table from running software simulations based on the model or other properties of engine 10.

Figure 5:
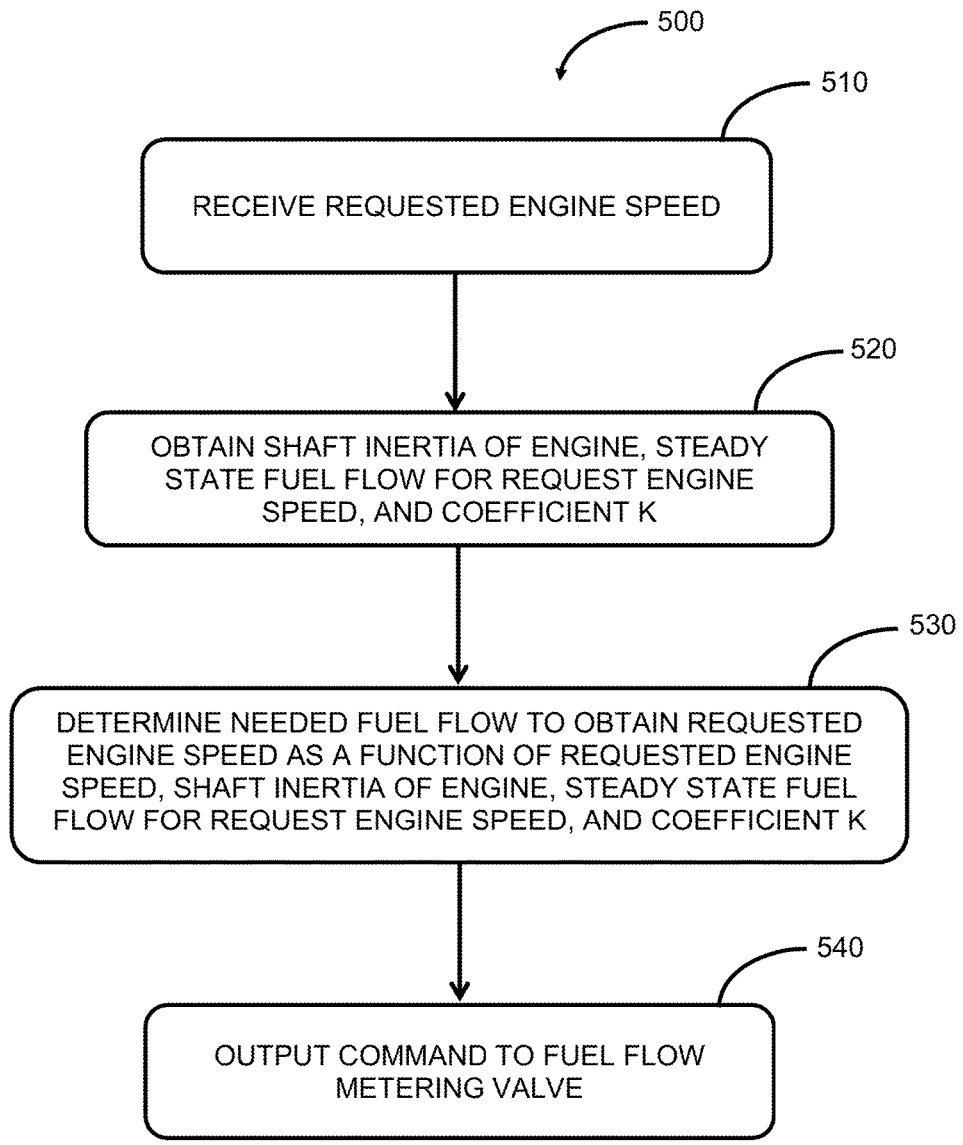
FIG. 5 is a flow chart of an example method performed by a controller.

Referring now to FIG. 5, there is illustrated a flow chart of an example method 500 performed by EEC 202 to control the engine 10. At step 510, EEC 202 receives a requested gas generator speed Ngreq of the engine. At step 520, EEC 202 obtains shaft inertia Jgg of the engine, steady state fuel flow WFss for the requested gas generator speed Ngreq, and coefficient K. At step 530, EEC 202 determines the required fuel flow to obtain the requested gas generator speed Ngreq as a function of the requested gas generator speed Ngreq, the steady state fuel flow WFss, the shaft inertia Jgg, and the coefficient K. At step 540, EEC 202 outputs a command to a fuel flow metering valve 204, the fuel flow metering valve 204 arranged to control a fuel flow to the engine 10.

In some embodiments, the method 500 further comprises a step of limiting acceleration of the gas turbine engine 10 by applying a rate limit to the requested engine speed, for example using rate limiter 230. In some embodiments, the required fuel flow is adjusted based on an acceleration error, for example using feedback controller 210, where the acceleration error is determined based on a reference acceleration and an actual engine acceleration determined from an actual gas generator speed.

Figure 6:
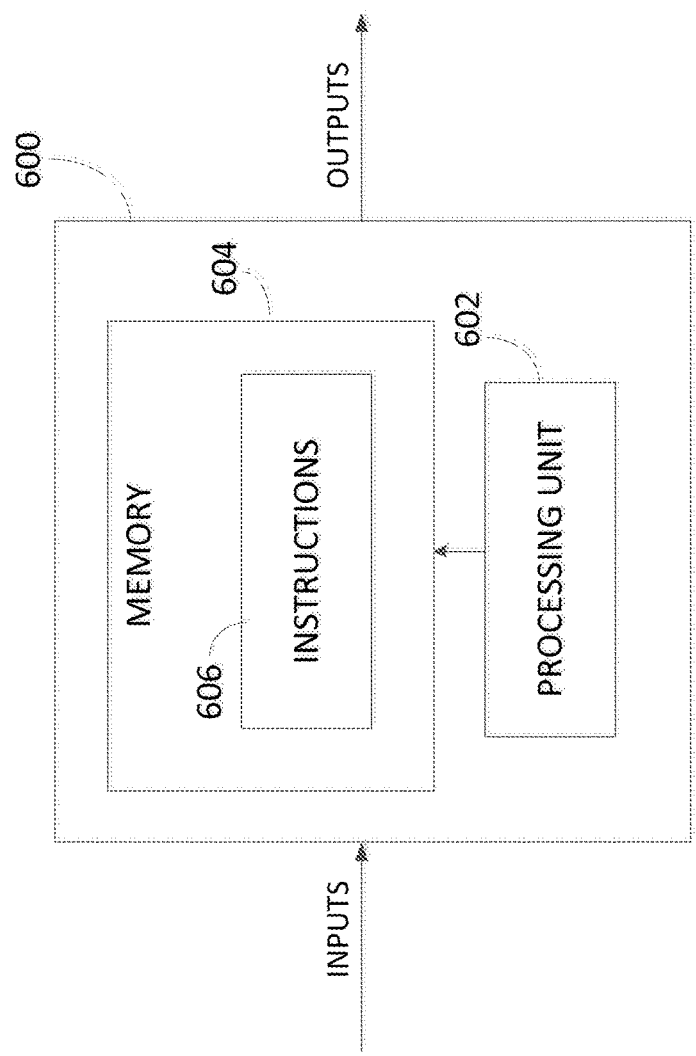
FIG. 6 shows a schematic representation of an example controller.

FIG. 6 shows a schematic representation of the EEC 202, as a combination of software and hardware components in a computing device 600. The computing device 600 may comprise one or more processing units 602 and one or more computer—readable memories 604 storing machine-readable instructions 606 executable by the processing unit 602 and configured to cause the processing unit 602 to generate one or more outputs 610 based on one or more inputs 608. The inputs may comprise one or more signals representative of the requested gas generator speed, the shaft inertia value, and the steady state fuel flow. The outputs 610 may comprise one or more signals representative of the feedforward fuel flow, the feedback fuel flow, and the fuel flow command.

Processing unit 602 may comprise any suitable devices configured to cause a series of steps to be performed by computing device 600 so as to implement a computer-implemented process such that instructions 606, when executed by computing device 600 or other programmable apparatus, may cause the functions/acts specified in method 500 to be executed. Processing unit 602 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 604 may comprise any suitable known or other machine-readable storage medium. Memory 704 may comprise non-transitory computer readable storage medium such as, for example, but not limited to, an electronic, magnetic, optical, electromagnetic, infrared, or semiconductor system, apparatus, or device, or any suitable combination of the foregoing. Memory 604 may include a suitable combination of any type of computer memory that is located either internally or externally to computing device 600 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g. devices) suitable for retrievably storing machine-readable instructions 606 executable by processing unit 602.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 604) having computer readable program code (e.g., instructions 606) embodied thereon. The computer program product may, for example, be executed by a computer to cause the execution of one or more methods disclosed herein in entirety or in part.

Computer program code for carrying out operations for aspects of the present disclosure in accordance with instructions 606 may be written in any combination of one or more programming languages, including an object oriented programming language such as Java, Smalltalk, C++ or the like and conventional procedural programming languages, such as the "C" programming language or other programming languages. Such program code may be executed entirely or in part by a computer or other data processing device(s). It is understood that, based on the present disclosure, one skilled in the relevant arts could readily write computer program code for implementing the methods disclosed herein.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A system for controlling a gas turbine engine, the system comprising:
    an interface to a fuel flow metering valve for controlling a fuel flow to the engine in response to a fuel flow command; and
    a controller connected to the interface and configured for outputting the fuel flow command to the fuel flow metering valve in accordance with a required fuel flow, the controller comprising a feedforward controller configured for:
        receiving a requested engine speed;
        obtaining a shaft inertia of the engine, a steady state fuel flow for the requested engine speed, and a relationship between fuel flow and acceleration power generated by the fuel flow; and
        determining the required fuel flow to obtain an engine acceleration as a function of the requested engine speed, the shaft inertia of the engine, the steady state fuel flow for the requested engine speed, and the relationship between fuel flow and acceleration power generated by the fuel flow.

2. The system of claim 1, wherein the controller is further configured to limit acceleration of the gas turbine engine by applying a rate limit to the requested engine speed.

3. The system of claim 1, wherein the controller comprises a feedback controller configured to adjust the required fuel flow based on an acceleration error.

4. The system of claim 3, wherein the acceleration error is determined based on a reference acceleration and an actual engine acceleration determined from an actual gas generator speed.

5. The system of claim 1, wherein the feedforward controller is configured to obtain the steady state fuel flow for the requested engine speed from a look-up table.

6. The system of claim 1, wherein determining the required fuel flow comprises applying the equation:

$$K(\Delta Wf) = P_{Accel},$$

wherein:
$\Delta Wf$ represents additional fuel flow to be added to a current fuel flow for operating in a steady-state at the requested engine speed;
$P_{Accel}$ represents acceleration power of the engine generated from the additional fuel flow; and
K is a linear coefficient representing the relationship between fuel flow and acceleration power generated by the fuel flow.

7. The system of claim 1, wherein determining the required fuel flow comprises applying the equation:

$$K(Wf_{tot} - Wf_{ss}) = J_{gg} N_g \dot{N}_g K_{units},$$

wherein:
$Wf_{tot}$ represents a total fuel flow;
$J_{gg}$ represents the shaft inertia of the engine;
$N_g$ represents a current gas generator speed;
$Wf_{ss}$ represents the steady state fuel flow for $N_g$;
K is a linear coefficient representing the relationship between fuel flow and acceleration power generated by the fuel flow; and
$K_{units}$ represents a coefficient accounting for unit conversions.

8. The system of claim 1, wherein determining the required fuel flow comprises applying the equation:

$$Wf_{FF} = \frac{J_{gg} N_{g_{req}} \dot{N}_{g_{req}} K_{units}}{K} + Wf_{ss},$$

wherein:
$Wf_{FF}$ represents the output of the feedforward controller;
$Wf_{ss}$ represents the steady state fuel flow for the requested engine speed;

$J_{gg}$ represents the shaft inertia of the engine;
$Ng_{req}$ represents the requested engine speed;
K is a linear coefficient representing the relationship between fuel flow and acceleration power generated by the fuel flow; and
$K_{units}$ represents a coefficient accounting for unit conversions.

9. A method for controlling a gas turbine engine, the method comprising:
receiving a requested engine speed;
obtaining a shaft inertia of the engine, a steady state fuel flow for the requested engine speed, and a relationship between fuel flow and acceleration power generated by the fuel flow;
determining a required fuel flow to obtain an engine acceleration as a function of the requested engine speed, the shaft inertia of the engine, the steady state fuel flow for the requested engine speed, and the relationship between fuel flow and acceleration power generated by the fuel flow; and
outputting a command to a fuel flow metering valve in accordance with the required fuel flow.

10. The method of claim 9, further comprising limiting acceleration of the gas turbine engine by applying a rate limit to the requested engine speed.

11. The method of claim 9, further comprising adjusting the required fuel flow based on an acceleration error.

12. The method of claim 11, wherein the acceleration error is determined based on a reference acceleration and an actual engine acceleration determined from an actual gas generator speed.

13. The method of claim 9, wherein the steady state fuel flow for the requested engine speed is obtained from a look-up table.

14. The method of claim 9, wherein determining the required fuel flow comprises applying the equation:

$$K(\Delta Wf) = P_{Accel},$$

wherein:
$\Delta Wf$ represents additional fuel flow to be added to a current fuel flow for operating in a steady-state at the requested engine speed;
$P_{Accel}$ represents acceleration power of the engine generated from the additional fuel flow; and
K is a linear coefficient representing the relationship between fuel flow and acceleration power generated by the fuel flow.

15. The method of claim 9, wherein determining the required fuel flow comprises applying the equation:

$$K(Wf_{tot} - Wf_{ss}) = J_{gg} N_g \dot{N}_g K_{units},$$

wherein:
$Wf_{tot}$ represents a total fuel flow;
$J_{gg}$ represents the shaft inertia of the engine;
$N_g$ represents a current gas generator speed;
$Wf_{ss}$ represents the steady state fuel flow for $N_g$;
K is a linear coefficient representing the relationship between fuel flow and acceleration power generated by the fuel flow; and
$K_{units}$ represents a coefficient accounting for unit conversions.

16. The method of claim 9, wherein determining the required fuel flow comprises applying the equation:

$$Wf_{FF} = \frac{J_{gg} Ng_{req} \dot{N} g_{req} K_{units}}{K} + Wf_{SS},$$

wherein:
$Wf_{FF}$ represents the output of the feedforward controller;
$Wf_{ss}$ represents the steady state fuel flow for the requested engine speed;
$J_{gg}$ represents the shaft inertia of the engine;
$Ng_{req}$ represents the requested engine speed;
K is a linear coefficient representing the relationship between fuel flow and acceleration power generated by the fuel flow; and
$K_{units}$ represents a coefficient accounting for unit conversions.

17. A non-transitory computer-readable medium having stored thereon program code executable by a processor for controlling a gas turbine engine, the program code comprising instructions for:
receiving a requested engine speed;
obtaining a shaft inertia of the engine, a steady state fuel flow for the requested engine speed, and a relationship between fuel flow and acceleration power generated by the fuel flow;
determining a required fuel flow to obtain an engine acceleration as a function of the requested engine speed, the shaft inertia of the engine, the steady state fuel flow for the requested engine speed, and the relationship between fuel flow and acceleration power generated by the fuel flow; and
outputting a command to a fuel flow metering valve in accordance with the required fuel flow.

18. The non-transitory computer-readable medium of claim 17, wherein the program code further comprises instructions for limiting acceleration of the gas turbine engine by applying a rate limit to the requested engine speed.

19. The non-transitory computer-readable medium of claim 17, wherein the program code further comprises instructions for adjusting the required fuel flow based on an acceleration error.

20. The non-transitory computer-readable medium of claim 17, wherein determining the required fuel flow comprises applying the equation:

$$Wf_{FF} = \frac{J_{gg} Ng_{req} \dot{N} g_{req} K_{units}}{K} + Wf_{SS},$$

wherein:
$Wf_{FF}$ represents the output of the feedforward controller;
$Wf_{ss}$ represents the steady state fuel flow for the requested engine speed;
$J_{gg}$ represents the shaft inertia of the engine;
$Ng_{req}$ represents the requested engine speed;
K is a linear coefficient representing the relationship between fuel flow and acceleration power generated by the fuel flow; and
$K_{units}$ represents a coefficient accounting for unit conversions.

* * * * *